(12) United States Patent
Gupta

(10) Patent No.: US 10,885,191 B1
(45) Date of Patent: Jan. 5, 2021

(54) DETONATE TARGETED MALWARE USING ENVIRONMENT CONTEXT INFORMATION

(71) Applicant: CA, Inc., San Jose, CA (US)

(72) Inventor: Prashant Gupta, Cheltenham (GB)

(73) Assignee: CA, Inc., San Jose, CA (US)

( * ) Notice: Subject to any disclaimer, the term of this patent is extended or adjusted under 35 U.S.C. 154(b) by 217 days.

(21) Appl. No.: 16/018,340

(22) Filed: Jun. 26, 2018

(51) Int. Cl.
*G06F 9/455* (2018.01)
*G06F 21/56* (2013.01)
*G06F 21/53* (2013.01)

(52) U.S. Cl.
CPC ........ *G06F 21/566* (2013.01); *G06F 9/45558* (2013.01); *G06F 21/53* (2013.01); *G06F 2009/45587* (2013.01); *G06F 2009/45591* (2013.01); *G06F 2221/034* (2013.01)

(58) Field of Classification Search
CPC .. G06F 21/566; G06F 21/53; G06F 2221/034; G06F 2009/45587; G06F 2009/45591
See application file for complete search history.

(56) References Cited

U.S. PATENT DOCUMENTS

| | | | |
|---|---|---|---|
| 9,104,867 B1* | 8/2015 | Thioux | G06F 21/56 |
| 9,882,929 B1* | 1/2018 | Ettema | G06F 9/45533 |
| 2011/0209218 A1* | 8/2011 | McRae | G06F 21/567 |
| | | | 726/23 |
| 2011/0219449 A1* | 9/2011 | St. Neitzel | G06F 11/00 |
| | | | 726/23 |

OTHER PUBLICATIONS

"VMRay Analyzer 2.2—An Improved User Experience for Malware Analysts and Incident Responders," http://www.vmray.com/cyber-security-blog/category/product-features/, accessed Jul. 2, 2018.

* cited by examiner

*Primary Examiner* — Alexander Lagor
*Assistant Examiner* — Vu V Tran
(74) *Attorney, Agent, or Firm* — Shook, Hardy & Bacon L.L.P.

(57) ABSTRACT

In one embodiment, a computer-implemented method for using customer context to detonate malware may be performed by one or more computing devices, each comprising one or more processors. The method may include receiving an artefact associated with a first device being targeted by malware, simulating in a controlled environment attributes of the first device based at least in part on the artefact, executing the malware in the controlled environment while the attributes of the first device are being simulated, and performing a security action with respect to the malware based at least in part on the execution of the malware in the controlled environment.

20 Claims, 8 Drawing Sheets

DETONATE TARGETED MALWARE USING ENVIRONMENT CONTEXT INFORMATION

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. In some cases, malware may be actively aware of context information about a recipient environment, which may enable the malware to bypass analysis in dynamic analysis environments.

SUMMARY

According to at least one embodiment, a method for using environment context information to detonate malware is described. The method may be performed by one or more computing devices where each has one or more processors. The method may include receiving, by the one or more computing devices, an artefact associated with a first device being targeted by malware; simulating in a controlled environment, by the one or more computing devices, attributes of the first device based at least in part on the artefact; executing the malware in the controlled environment while the attributes of the first device are being simulated; and performing a security action with respect to the malware based at least in part on the execution of the malware in the controlled environment.

The method may include monitoring the first device and determining that the first device is being targeted by the malware based at least in part on the monitoring. The method may include identifying the malware based at least in part on the monitoring. Simulating the attributes of the first device may include acquiring the malware from the first device or in route to the first device. Simulating the attributes of the first device may include staging the artefacts within the controlled environment and introducing the malware to the controlled environment. The one or more computing devices include a server running the controlled environment remotely from the first device.

Performing the security action may include identifying one or more attributes of the malware based at least in part on the malware being induced to execute by simulating the attributes of the first device. Performing the security action may include creating one or more signatures of the malware based at least in part on identifying the one or more attributes of the malware. Performing the security action may include using the one or more signatures to identify the malware on a second device different from the first device.

The artefact may be received in a system snapshot captured by a software agent running on the first device. The artefact may include environment context information of the first device. The artefact may include at least one of an operating system manufacturer, basic input output system (BIOS) manufacturer, BIOS version, system name of the first device, system manufacturer, a user name associated with the first device, storage drive manufacturer, storage drive size, storage drive type, processor manufacturer, processor speed, processor cache entry, main memory manufacturer, main memory size, registry entry, web browser cookie, one or more files of a file system used by the first device, one or more directories of the file system, metadata of the file system, geographic location information of the first device, time zone information of the first device, mouse manufacturer, mouse movement data, keyboard manufacturer, a language associated with the keyboard, keyboard entry data, computer screen attribute, or any combinations thereof.

A computing device configured for using customer context to detonate malware is also described. The device may include a processor; memory in electronic communication with the processor. In some cases, the memory may store computer executable instructions that when executed by the processor cause the processor to perform the steps of receiving, by the one or more computing devices, an artefact associated with a first device being targeted by malware; simulating in a controlled environment, by the one or more computing devices, attributes of the first device based at least in part on the artefact; executing the malware in the controlled environment while the attributes of the first device are being simulated; and performing a security action with respect to the malware based at least in part on the execution of the malware in the controlled environment.

A computer-program product for using customer context to detonate malware is also described. The computer-program product may include a non-transitory computer-readable medium storing instructions thereon. When the instructions are executed by one or more processors, the execution of the instructions may cause the one or more processors to perform the steps of receiving, by the one or more computing devices, an artefact associated with a first device being targeted by malware; simulating in a controlled environment, by the one or more computing devices, attributes of the first device based at least in part on the artefact; executing the malware in the controlled environment while the attributes of the first device are being simulated; and performing a security action with respect to the malware based at least in part on the execution of the malware in the controlled environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
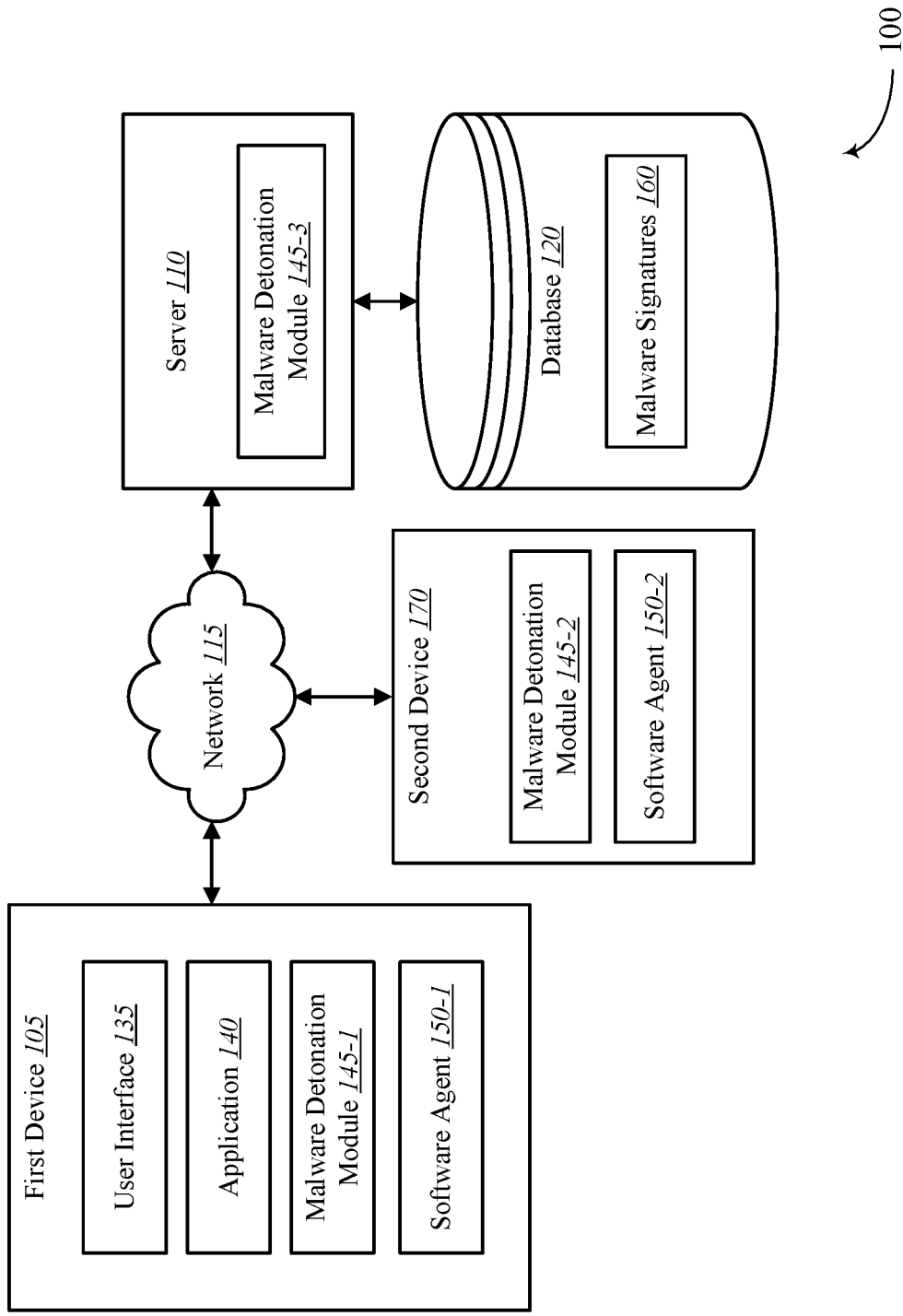
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Some types of malware are aware of context information about the targeted device's environment. In some cases, malware may not execute a process if the malware is not presented with one or more certain artefacts of a target machine. In some cases, malware may be configured to detect when it is in a simulated environment and so to remain "quiet" or dormant by not executing or doing anything else, thus remaining undetected in the conventional simulated environment. Accordingly, in one embodiment the simulated environment mimics the target machine and coaxes the malware into executing so that analysis system of the simulated environment is enabled to learn about the malware and use what is learned to stop malware on targeted devices.

In some cases, a method of using the environmental context of a targeted device includes a software agent on an endpoint of the device that provides a snapshot of information about the context environment of the device. Such a snapshot may include the artefacts that the malware looks for or confirms are present in the affected system before initiating execution. A sandbox or another type of simulation environment may have access to the data from the snapshots. In some cases, a software agent running on the targeted machine may detect the malware and capture a snapshot of the system artefacts (e.g., one or more systems settings and/or configuration of the targeted machine). In some cases, the software agent may send the snapshot to a predetermined computer system remote to the targeted machine (e.g., a server hosting the sandbox, etc.). In some cases, the software agent may send information about the malware and/or at least a portion of the malware to the remote system.

The artefacts from the snapshots may be staged within the simulated environment to induce execution of the malware. The sandbox, simulating the environment of the targeted machine, may present this information from the snapshots within the simulated environment to samples of malware executing within the simulated environment. The malware may detect these artefacts and be induced to execute one or more processes of the malware as the malware would have done on the targeted machine. In some cases, the malware may check for specific artefacts to ensure that the malware is within the proper environment before executing. In such a circumstance, the malware may check the environment and find the artefacts that the malware is programmed to look for in the actual targeted environment of the client device. Thus, the malware may be tricked into thinking that the malware is within the actual targeted device, not a simulation of the targeted device. With the malware executing within the simulated environment, the attributes of the malware may be discovered and analyzed. Thus, the processes associated with the malware may be identified as well as the signatures of the malware without the malware actually executing on the targeted device.

As the malware runs on the sandbox or on another type of simulated environment, the sandbox may learn attributes about the malware. For example, the sandbox may learn what registries the malware uses, what resources the malware uses, what processes the malware executes, details about the processes run by the malware including process name, software code of the process, other types of details about the malware, or any combination thereof. In some cases, the analysis system of the simulated environment may create one or more signatures of the malware based on what analysis of the malware in the sandbox provides and use the signatures to identify the malware out in the real world on monitored computing systems.

In some cases, the system may implement one or more security actions in response to the execution of the malware in the simulated environment. The security actions may include at least one of identifying one or more attributes of the malware as the malware is triggered by the simulated artefacts to execute, creating one or more signatures of the malware based at least in part on identifying the one or more attributes of the malware, or using the one or more signatures to identify the malware on a second device different from the first device, or any combination thereof.

Without acquiring the artefacts of the targeted device, conventional sandboxes may fail to induce malware to execute. When a conventional sandbox is unable to induce malware to execute, the conventional sandbox is unable to identify signatures of malware. When a conventional sandbox is unable to identify signatures of the malware, the conventional monitoring system is unable to detect the malware in the real world environment, resulting in an increase in infected systems. The features described herein may be configured to enable dynamic analysis environments to evolve as malware evolves, enabling the dynamic analysis environments to trick malware into executing in simulated environments. In some embodiments, a simulated environment may be implemented in and/or use at least one of a virtual machine (VM), hypervisor, physical machine implementing device drivers, etc., or any combination thereof.

FIG. 1 is a block diagram illustrating one embodiment of an environment 100 in which the present systems and methods may be implemented. In some embodiments, the systems and methods described herein may be performed on at least one device (e.g., first device 105, second device 170, and/or server 110). As depicted, the environment 100 may include a first device 105, a second device 170, a server 110, a database 120, and a network 115 that allows the device 105, the server 110, and database 120 to communicate with one another.

Examples of the first device 105 may include any combination of mobile devices, smart phones, personal computing devices, computers, laptops, desktops, servers, media content set top boxes, routers, or any combination thereof. Examples of server 110 may include any combination of a data server, a cloud server, an automation server, proxy server, mail server, web server, application server, database server, communications server, file server, home server, mobile server, name server, or any combination thereof.

In some configurations, the first device 105 may include a user interface 135, application 140, malware detonation module 145-1, and software agent 150-1. Although the components of the first device 105 are depicted as being internal to the first device 105, it is understood that one or more of the components may be external to the first device 105 and connect to first device 105 through wired and/or wireless connections. In some embodiments, application 140 may be installed on a remote computing device in order to allow a remote user to interface with a function of first device 105, malware detonation module 145-1-3, and/or server 110.

In some examples, the first device is a malware target. The first device 105, the second device 170, the server 110 or another device may detect the malware on the first device 105. In some cases, an email, an attachment, a text message, another type of message, a weblink, data, or other types of communications that contain malware may be intercepted before the malware arrives at the first device 105. In other cases, the malware may be present on the first device 105 when the malware is detected.

The software agent 150-1 of the first device 105 may send snapshot information to the second device 170. The snapshot information may include data about the first device's environment, including its artefacts. The second device 170 may simulate the first device 105 by presenting the artefacts from the first device 105 to simulate the first device 105 within the second device 170. The malware may be introduced into the second device 170. In some cases, the malware does not execute without the artefacts from the first device 105. In such a circumstance, the malware may be triggered in the second device 170 because the simulated environment within the second device 170 presents the artefacts of the first device 105 as thought the second device 170 was the first device 105. The attributes of the malware can be ascertained in the second device 170. The attributes and/or signatures of the malware can be derived from the malware's execution within the second device 170. The attributes obtained can be used to identify the malware being targeted to other devices or located on other devices. In some cases, the attributes obtained about the malware from the execution in the controlled environment on the second device 170 can be applied to executing a security action to minimize damage caused by the malware, remediate damage caused by the malware, prevent damage caused by the malware, or perform another action to counteract the malicious effects of the malware.

In some cases, the malware may attempt to avoid detection may being installed into the first device in portions over time. In some cases, the malware may not be detected until at a least a portion of the malware is on the first device 105. In some cases, the earlier installed portions of the malware may make some minor changes to contextual environment of the first device 105. For example, the earlier installed portion of the malware may insert itself into a registry or into a folder. In order for the malware to execute in the second device 170, these earlier effects of the malware may have to be present for the malware to execute. The malware may send portions of its self over time to the first device to avoid detection. In some cases, the malware may send the portions over time so that the later sent portions of the malware can use the earlier sent portions of the malware on the targeted device to trigger the use of the later sent portions of the malware. In those examples, where the snapshots of the first device's environment are sent to the second device, the effects of the earlier installed malware may be included as artefacts of the first device 105. Thus, any changes that the malware has made to the first device 105 over time can be included in the simulated environment within the second device 170. With the changes made to the first device 105 simulated in the second device 170, the malware may be tricked into believing that it is in the first device and be lulled into executing within the simulated environment of the second device 170.

In some embodiments, first device 105 and second device 170 may communicate with the server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the first device 105 may not include a user command module 145-1. For example, the first device 105 may include application 140 that allows first device 105 to interface with a remote device via the malware detonation module 145-1 located on another device such as a remote computing device and/or server 110. In some embodiments, the first device 105, the second device 170, and the server 110 may include malware detonation modules 145-1-3 where at least a portion of the functions of the malware detonation modules 145-1-3 are performed separately and/or concurrently on the first device 105, the second device 170, and/or server 110. Likewise, in some embodiments, a user may access the functions of first device 105 (directly or through first device 105 via malware detonation module 145-1) from a remote computing device. For example, in some embodiments, a remote computing device includes a mobile application that interfaces with one or more functions of first device 105, the second device, the malware detonation module 145-1, and/or server 110.

In some embodiments, server 110 may be coupled to database 120. Database 120 may be internal or external to the server 110. In one example, device 105 may be coupled directly to database 120, database 120 being internal or external to device 105. Attributes learned about the malware when the malware is allowed to execute in the controlled environment of the second device may be stored in the database and used to construct signatures about the malware. As illustrated, database 120 may include malware signatures 160. Malware signatures 160 may be used to identify the existence of the malware on other affected devices. The database 120 may store malware signatures 160 that represent one or more attributes of the malware. In some cases where the malware is sent in portions over time to the target device (e.g., a first portion of the malware is sent is a first email, and a second portion of the malware is sent in a second email after the first, etc.), at least some of malware signatures 160 may represent just one of the portions of the malware. In some circumstances, the earlier sent portion of the malware may be identified by using the malware signatures stored in the database 120 and be removed from the target device. In this situation when the later sent portions of the malware are sent to the target device, these later sent portions of the malware may also be removed based on malware signatures 160, or if the later sent portions of the malware are undetected, the malware will be unable to execute because the earlier sent portions of the malware are unavailable to the malware, preventing the malware from executing.

Figure 2:
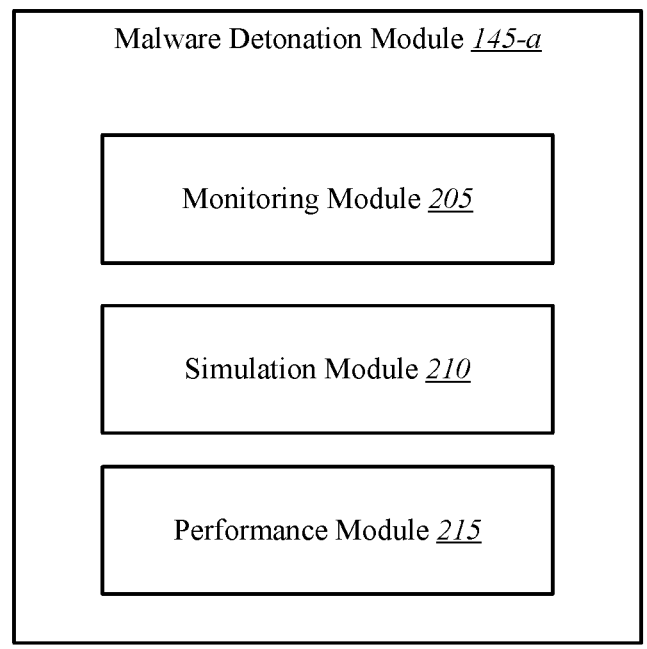
FIG. 2 is a block diagram illustrating one example of a malware detonation module.

FIG. 2 is a block diagram illustrating one example of a malware detonation module 145-a. The malware detonation module 145-a may be one example of the malware detonation module 145-1-3 depicted in FIG. 1. As depicted, the malware detonation module 145-*a* may include a monitoring module 205, a simulation module 210, and a performance module 215.

The monitoring module 205 may monitor a specific device, a group of devices, a network, an environment, or combinations thereof to identify malware and/or devices targeted by malware. In some cases, the monitoring module 205 scans emails, attachments, and other types of messages to identify the presence of malware. In other cases, the monitoring module 205 may scan the device looking for symptoms of the malware.

The simulation module 210 may simulate a targeted device in a controlled environment, such as on a remote device. Artefacts, such as environment context information, may be obtained by the remote device to simulate the targeted device. In some cases, a software agent running on the targeted device or another device may send the artefacts to the device simulating the targeted device. In some cases, the software agents may take snapshots of at least a portion of the information stored and organized in the targeted device. These snapshots may be taken and/or sent over time. The remote device simulating the targeted device may derive the artefacts from these snapshots and implement them in a sandbox to simulate the targeted device. Recognizing the artefacts of the targeted device, the malware may then be induced to execute within the simulated, controlled environment, where the signatures of the malware can be ascertained.

The performance module 215 may implement a security action based on the attributes of the malware. For example, the performance module 215 may cause a remedial action to counteract the effects of the malware. In some cases, the attributes learned about the malware in the simulated environment may be used to identify the existence of the malware on other devices, to repair at least some of the damage caused by the malware, to prevent the malware from being effective, to initiate another type of security action, or combinations thereof.

Figure 3:
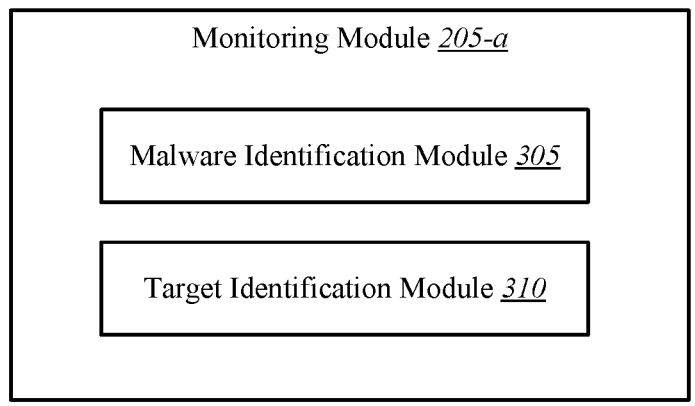
FIG. 3 is a block diagram illustrating one example of a monitoring module.

FIG. 3 is a block diagram illustrating one example of a monitoring module 205-*a*. The monitoring module 205-*a* may be one example of monitoring module 205 depicted in FIG. 2. As depicted, the monitoring module 205-*a* may include a malware identification module 305 and a target identification module 310.

The malware identification module 305 may identify the presence of malware. Such malware may be identified on a device or the malware may be identified on the way to the targeted device. In some cases, the malware identification module 305 may be detected in an email, a link, an attachment, an environment, or another location. The malware may be identified by the effects produced by the malware. For example, the malware identification module 305 may identify the presence of malware when the device begins to function improperly or the device operates differently than expected. In yet some other circumstances, the malware may be identified through scanning a device, messages to the device, or attachments embedded in the messages to the device.

The target identification module 310 may identify the device targeted by the malware. In some cases, the target identification module 310 may identify the target of the malware when the malware is embedded in a message, such as a text or instant messenger, that is directed to a specific device. In some cases, the message may be routed to a particular device by having the device's media access controller (MAC) address, internet protocol address, or another type of address. In another example, the malware may be part of an email. In this case, the email may be sent to a user account that is accessible from multiple types of devices. In some cases where the malware is embedded in an email, the malware may be intended for any device associated with the user. However, in some circumstances, the malware may be intended for a specific device that is likely to be used by the user to access the email account.

In some cases, the target identification module 310 may analyze artefacts of a device to determine whether the device has already receive at least a portion of the malware package. For example, in some cases, the malware may deposit a portion of its code or cause another type of effect in the device over time, such as changing a registry or another type of effect. For example, the device may receive messages that include portions of the malware in separate emails over the course of time. In such a situation, the malware may not be executed until the final piece of the malware is received by the device and certain conditions are met. In some cases, the target identification module 310 may identify the portions of the malware that are sent over time.

Figure 4:
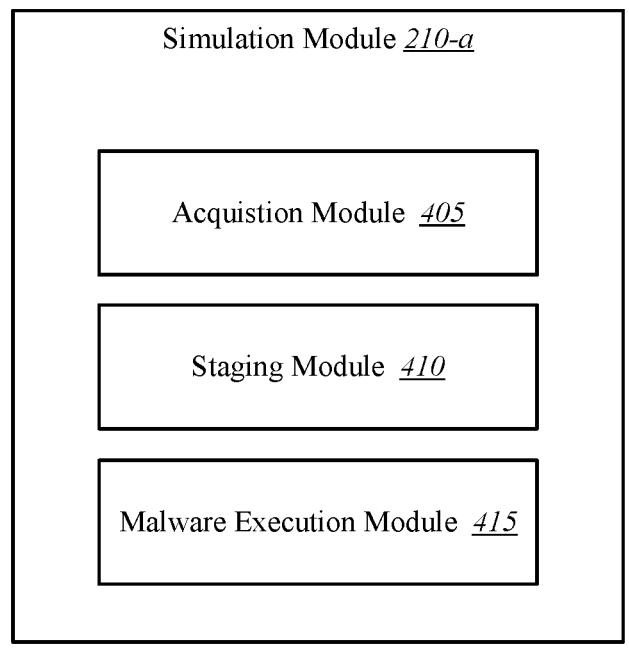
FIG. 4 is a block diagram illustrating one example of a simulation module.

FIG. 4 is a block diagram illustrating one example of a simulation module 210-*a*. The simulation module 210-*a* may be one example of the simulation module 210 depicted in FIG. 2. As depicted, the simulation module 210-*a* may include an acquisition module 405, a staging module 410, and a malware execution module 415.

The acquisition module 405 may cause the artefacts from the targeted device to be obtained by another device to simulate the targeted device in a controlled environment. The acquisition module 405 may cause the artefacts to be obtained by causing the second device to request information about the artefacts from the first device. In response to the request, the first device may send the requested data to the second device to simulate the first device in the controlled environment.

In another example, the first device that is targeted by the malware may include a software agent that tracks the contextual information of the first device. In some cases, the software agents captures snapshots of the first device's data and sends the snap shot to the second device. In some cases, the snapshots may be analyzed by the malware identification module or the target identification module to identify the presence of malware in the first instance. In some cases, the malware is already detected on the first device when the software agent captures the data. In this situation, the second device may only receive the snapshot when it is desired to simulate the first device.

In some cases, the second device receives snapshots of the first device's information over time. In this type of circumstance, the second device may store the information of the first device over time. Further, in this type of example, the second device may only simulate the environment of the first device when the second device receives an instruction to perform the simulation. In other examples, the second device may determine based on the information received by the second device to construct the simulated environment.

Any appropriate number of artefacts may be sent to the second device. In some cases, the simulation of the first device may be performed with a single artefact from the first device. In such an example, the second device may fill in the other types of information based on how the first device is configured. In another example, the second device receives multiple artefacts that can be used to simulate the environment of the first device. In yet another example, the second device receives all the artefacts that are available from the first device to simulate a more comprehensive and/or accurate representation of the first device.

The artefacts may be any appropriate type of artefact. In some examples, the artefact includes environment context information of the first device. At least one of the artefacts may be selected from the non-exhaustive list of at least one of an operating system manufacturer, basic input output system (BIOS) manufacturer, BIOS version, system name of the first device, system manufacturer, a user name associated with the first device, storage drive manufacturer, storage drive size, storage drive type, processor manufacturer, processor speed, processor cache entry, main memory manufacturer, main memory size, registry entry, web browser cookie, one or more files of a file system used by the first device, one or more directories of the file system, metadata of the file system, geographic location information of the first device, time zone information of the first device, mouse manufacturer, mouse movement data, keyboard manufacturer, a language associated with the keyboard, keyboard entry data, computer screen attribute, or any combinations thereof.

In some cases, the artefacts are used by the malware for execution. In such an example, the malware may not execute without the presence of at least one of the artefacts in the simulated environment. In some cases, a portion of the malware may be sent to the targeted device in stages where an earlier sent portion of the malware modifies at least one of the artifacts. The modified artefact may be used to by the malware to know when to execute. In this example, the artefacts sent from the first device may include a modified artefact that is already affected by the malware.

In some cases, the simulated environment is created in a sandbox that is run by the second device. In another example, the sandbox may be executed remotely by a server, such as the server 110 depicted in FIG. 1. While these examples have been described with reference to using a sandbox program to simulate the first device, any appropriate type of simulating program may be used in accordance with the principles described in the present disclosure.

The staging module 410 may cause the artefacts to be placed in an simulated environment of the first device. In some cases, the second device is independent and different from the first device such that the simulation of the first device in the second device is independent of the first device. The first device and second device may be isolated from one another so that the effects of the malware to the second device may not affect the first device. The artefacts of the first device may be incorporated into the simulated environment within the second device such that from the perspective of the malware, the simulated environment appears to be within the first device.

In some cases, the second device is cut off from the first device so that any issues or problems that occur in the simulation cannot affect the first device. In such an example, the device may not have permissions to send information to the first device after the simulation has occurred.

The malware execution module 415 may allow the malware to execute within the simulated environment of the second device. In those situations where the malware checks for at least one of the artefacts before triggering the execution of the malware, the artefacts may be included in the simulation. The simulated environment may trick the malware into thinking that the malware is on the first device. In such an example, when the malware thinks that it is in the first device, although the malware is really in the simulated environment, the malware may perform whatever function or task that the malware is intended to perform.

The attributes of the malware be may observed in the simulated environment to determine how to identify, prevent, and/or counteract at least some of the effects of the malware. The attributes of the malware may include characteristics of the malware such as tasks performed by the malware, the effects caused by the malware, the sequence of tasks performed by the malware, the speed at which at least one task is performed by the malware, the destination within the simulated environment targeted by the malware, other characteristics of the malware, or combinations thereof.

Figure 5:
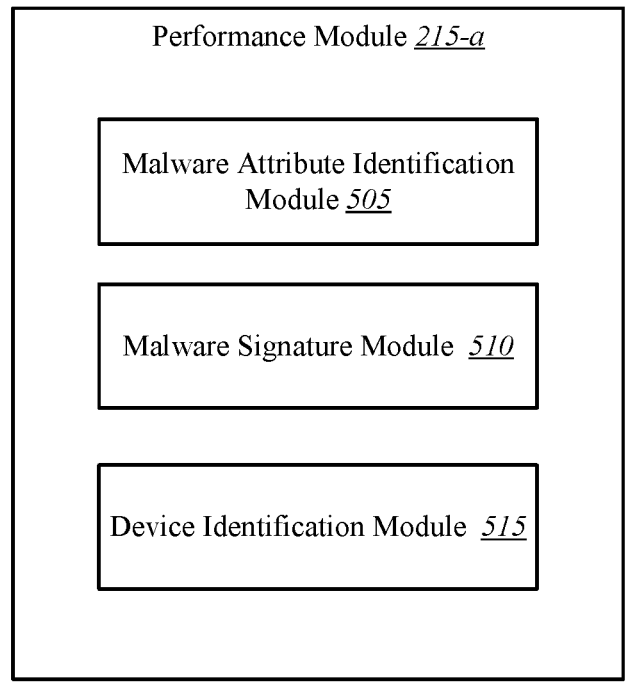
FIG. 5 is a block diagram illustrating one example of a performance module.

FIG. 5 is a block diagram illustrating one example of a performance module 215-a. The performance module 215-a may be one example of the performance module 215 depicted in FIG. 2. As depicted, the performance module 215-a may include a malware identification module 505, a malware signature module 510, and a device identification module 515.

The malware attribute identification module 505 may identify one or more attributes of the malware based at least in part on the malware being induced to execute by simulating the attributes of the first device. The attributes of the malware that are identified may be stored in a database that can be used as a reference when analyzing devices. The database may include the malware attributes from the simulated environment as well as malware attributes from other simulated environments or malware attributes discovered through other ways.

The malware signature module 510 may create one or more signatures of the malware based at least in part on identifying the one or more attributes of the malware. In some cases, the signatures may be based on attributes of the malware such as what registries the malware uses, what resources the malware uses, what processes the malware runs, details about the processes of the malware including process name, software code of the process, etc. These signatures may be used to identify malware or at least portions of malware. In some cases, the malware signatures represent at least a portion of the malware code. In some cases, the malware signature may include one or more unique values that indicate the presence of malicious code. In some cases, a signature may be calculated for one or more files or processes associated with the malware. For example, the signature may include a hash calculated from attributes and/or content of a file associated with the malware. The malware signatures may be stored in a database, such as the database depicted in FIG. 1. The database may contain multiple signatures from multiple malware codes.

The device identification module 515 may use the one or more signatures to identify the malware on another device different from the first device. The malware signature may be used when scanning devices, messages, and/or attachments in messages to different devices.

Figure 6:
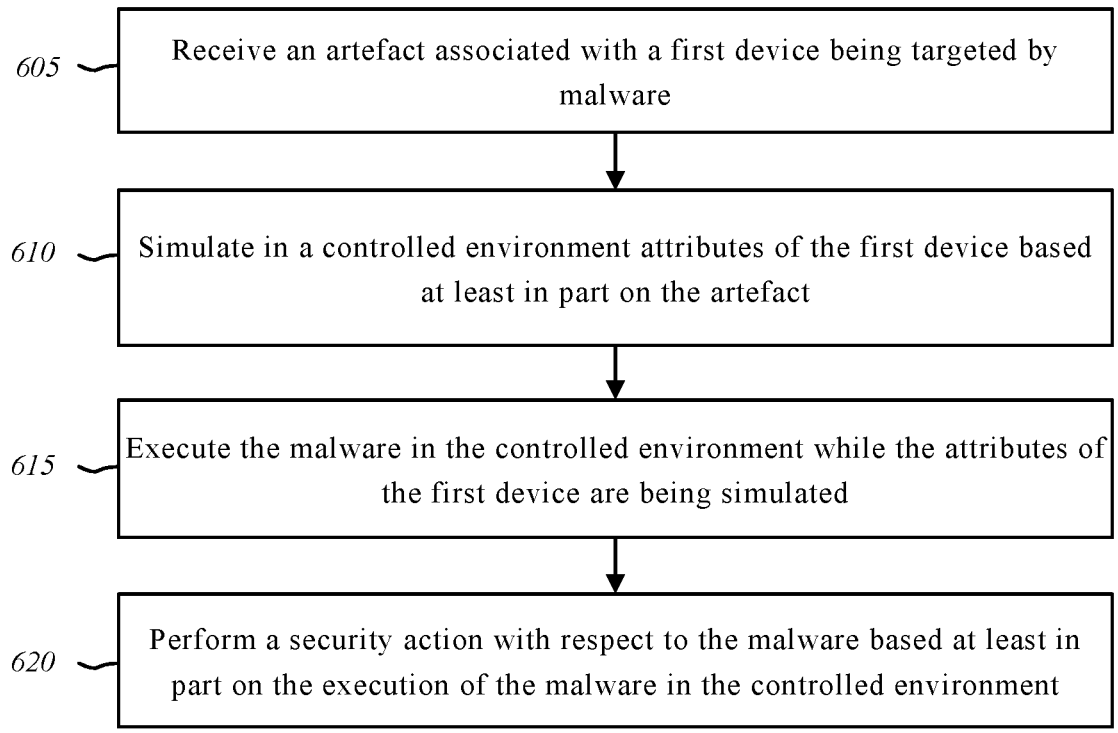
FIG. 6 is a flow diagram illustrating one embodiment of a method for using customer context to detonate malware.

FIG. 6 is a flow diagram illustrating one embodiment of a computer-implemented method 600 for using environment context information to detonate malware. In some configurations, the method 600 may be implemented by the malware detonation modules 145-1-3 illustrated in FIG. 1 or 2. In some configurations, the method 600 may be implemented in conjunction with the application 140 and/or the user interface 135 illustrated in FIG. 1.

At block 605, the method 600 may include receiving an artefact associated with a first device being targeted by malware. The artefacts may at least one of an operating system manufacturer, basic input output system (BIOS) manufacturer, BIOS version, system name of the first device, system manufacturer, a user name associated with the first device, storage drive manufacturer, storage drive size, storage drive type, processor manufacturer, processor speed, processor cache entry, main memory manufacturer, main memory size, registry entry, web browser cookie, one or more files of a file system used by the first device, one or more directories of the file system, metadata of the file system, geographic location information of the first device, time zone information of the first device, mouse manufacturer, mouse movement data, keyboard manufacturer, a language associated with the keyboard, keyboard entry data, computer screen attribute, or any combinations thereof.

In some cases, the artefacts are obtained by a software agent associated with the first device. The software agent may send a snapshot of the environmental context information of the first device to a second device. The artefacts may be sent to a second device in response to determining that at least a portion of the malware is on the first device, in response to determining that malware is targeting the first device, in response to another type of trigger, or combinations thereof. In some cases, the software agent periodically sends artefacts of the second device. In yet another example, the first device may send the artefacts in response to a request for the artefacts. While this example has been described as the software agent sending snapshots of the first device to the second device, the first device may send the artefacts to the second device in another format other than a snapshot, may send less information than is available in a snapshot, may send just specifically requested artefacts to the second device, or combinations thereof.

At block 610, the method 600 may include, simulating in a controlled environment attributes of the first device based at least in part on the artefact. In some examples, multiple artefacts are sent to the second device and the simulation is based on the multiple artefacts. Each of the desirable artefacts to be included in the simulation from the first device may be staged within the simulation. In some cases, the second device uses less than all of the artefacts sent from the first device in the simulation.

In some cases, the simulation is performed within a sandbox program on the second device; but in other examples, another type of program may be used to simulate the first device. The simulated device may be separate and independent of the first device such that the first device may be isolated from any issues that arise from execution of the malware within the simulation at the second device.

At block 615, the method 600 may include executing the malware in the controlled environment while the attributes of the first device are being simulated. In some cases, the malware may be lulled into executing within the simulated environment because execution of the malware may involve the presentation of at least one artefact of the first device in the simulated environment. In some cases, the malware remains inactive until the artefact or the desired combination of artefacts are present in the simulated environment. In some situations, the type of artefacts used by the malware may be identified while the malware is executing within the simulated environment. In some cases, just a portion of the artefacts are staged within the simulation to observe how the malware responds with just the limited number of artefacts. In those examples where the malware fails to execute in the presence of just a subset of the artefacts, additional or the rest of the artefacts may be introduced into the simulation.

The malware may be allowed to execute within the simulated environment under unrestricted conditions to observe how the malware is intended to act. In some cases, the malware may be allowed to act under at least one restriction. For example, the restriction may include a time restriction, destination restriction, an access restriction, another type of restriction, or combinations thereof. In some cases, the malware is allowed to execute under multiple conditions. By observing how the malware responds under multiple conditions may allow for the discovery of additional malware attributes. The different conditions in which the malware is allowed to execute under may represent different permission settings, different locations, different file contents, different downloaded applications, different circumstances, or combinations thereof that may be reasonable to anticipate that could be present on the first device.

At block 620, the method 600 may include performing a security action with respect to the malware based at least in part on the execution of the malware in the controlled environment. In some cases, the security action includes identifying attributes of the malware. These attributes may be used to create signatures of the malware. The malware signatures may represent an entire malicious code of the malware. In other examples, at least one of the malware signatures represents just a portion of the malware's code. The malware signatures may be used to determine existence of malware. In some cases, certain attributes of a device may be compared to the malware signatures to determine whether the malware is present on monitored devices. In other examples, the malware signatures may be consulted with analyzing attachments and/or links in emails, texts, or other types of messages.

Figure 7:
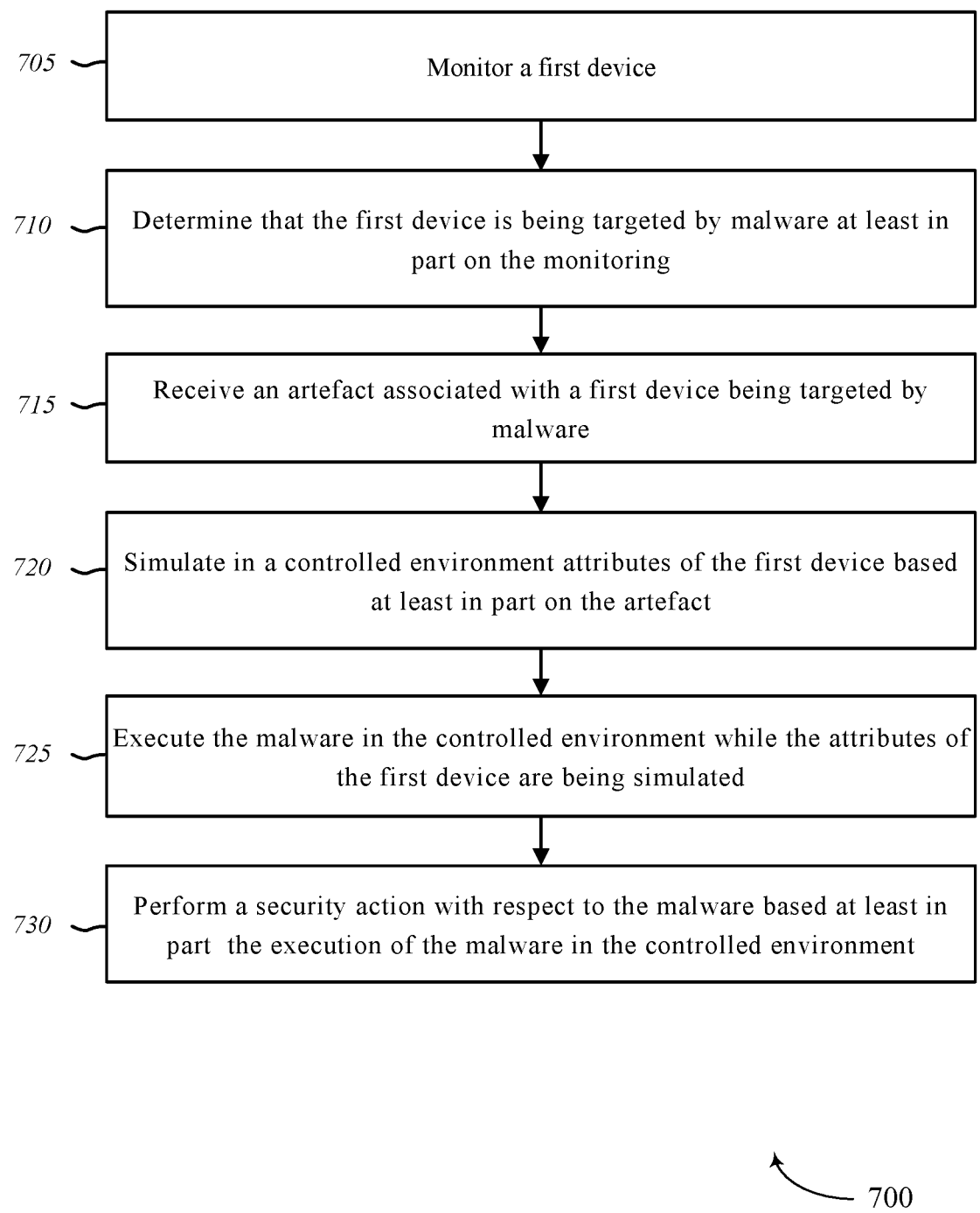
FIG. 7 is a flow diagram illustrating one embodiment of a method for using customer context to detonate malware.

FIG. 7 is a flow diagram illustrating one embodiment of a computer-implemented method 700 for using environment context information to detonate malware. In some configurations, the method 700 may be implemented by the malware detonation modules 145-1-3 illustrated in FIG. 1 or 2. In some configurations, the method 700 may be implemented in conjunction with the application 140 and/or the user interface 135 illustrated in FIG. 1.

At block 705, the method 700 may include monitoring a first device. The first device may be monitored using a software agent that is downloaded to the first device. In other examples, a remote server or a remote device monitors the first device. In some cases, the remote server or device requests information from the first device that can be analyzed to determine whether the first device includes malware. In some cases, monitoring the first device may include monitoring the messages received by the first device. In some cases, messages intended for the first device are scanned for malware prior to the first device receiving the messages. In this example, the malware may be analyzed before the first device actually receives the malware.

At block 710, the method 700 may include determining that the first device is being targeted by the malware at least in part on the monitoring. The software agent may identify when a situation that is indicative of malware is present on the first device or that malware is present in a message intended for the target device. In response to identifying a situation or message that is indicative of malware, the first device or the message intended for the first device may be flagged as including malware. The malware may be captured to be introduced into the simulated environment.

At block 715, the method 700 may include receiving an artefact associated with a first device being targeted by malware. The artefacts may at least one of an operating system manufacturer, basic input output system (BIOS) manufacturer, BIOS version, system name of the first device, system manufacturer, a user name associated with the first device, storage drive manufacturer, storage drive size, storage drive type, processor manufacturer, processor speed, processor cache entry, main memory manufacturer, main memory size, registry entry, web browser cookie, one or more files of a file system used by the first device, one or more directories of the file system, metadata of the file system, geographic location information of the first device, time zone information of the first device, mouse manufacturer, mouse movement data, keyboard manufacturer, a language associated with the keyboard, keyboard entry data, computer screen attribute, or any combinations thereof.

In some cases, the artefacts are obtained by a software agent associated with the first device. The software agent may send a snapshot of the environmental context information of the first device to a second device. The artefacts may be sent to a second device in response to determining that at least a portion of the malware is on the first device, in response to determining that malware is targeting the first device, in response to another type of trigger, or combinations thereof. In some cases, the software agent periodically sends artefacts of the second device. In yet another example, the first device may send the artefacts in response to a request for the artefacts. While this example has been described as the software agent sending snapshots of the first device to the second device, the first device may send the artefacts to the second device in another format other than a snapshot, may send less information than is available in a snapshot, may send just specifically requested artefacts to the second device, or combinations thereof.

At block 720, the method 700 may include, simulating in a controlled environment attributes of the first device based at least in part on the artefact. In some examples, multiple artefacts are sent to the second device and the simulation is based on the multiple artefacts. Each of the desirable artefacts to be included in the simulation from the first device may be staged within the simulation. In some cases, the second device uses less than all of the artefacts sent from the first device in the simulation.

In some cases, the simulation is performed within a sandbox program on the second device; but in other examples, another type of program may be used to simulate the first device. The simulated device may be separate and independent of the first device such that the first device may be isolated from any issues that arise from execution of the malware within the simulation at the second device.

At block 725, the method 700 may include executing the malware in the controlled environment while the attributes of the first device are being simulated. In some cases, the malware may be lulled into executing within the simulated environment because execution of the malware may involve the presentation of at least one artefact of the first device in the simulated environment. In some cases, the malware remains inactive until the artefact or the desired combination of artefacts are present in the simulated environment. In some situations, the type of artefacts used by the malware may be identified while the malware is executing within the simulated environment. In some cases, just a portion of the artefacts are staged within the simulation to observe how the malware responds with just the limited number of artefacts. In those examples where the malware fails to execute in the presence of just a subset of the artefacts, additional or the rest of the artefacts may be introduced into the simulation.

The malware may be allowed to execute within the simulated environment under unrestricted conditions to observe how the malware is intended to act. In some cases, the malware may be allowed to act under at least one restriction. For example, the restriction may include a time restriction, destination restriction, an access restriction, another type of restriction, or combinations thereof. In some cases, the malware is allowed to execute under multiple conditions. By observing how the malware responds under multiple conditions may allow for the discovery of additional malware attributes. The different conditions in which the malware is allowed to execute under may represent different permission settings, different locations, different file contents, different downloaded applications, different circumstances, or combinations thereof that may be reasonable to anticipate that could be present on the first device.

At block 730, the method 700 may include performing a security action with respect to the malware based at least in part the execution of the malware in the controlled environment. In some cases, the security action includes identifying attributes of the malware. These attributes may be used to create signatures of the malware. The malware signatures may represent an entire malicious code of the malware. In other examples, at least one of the malware signatures represents just a portion of the malware's code. The malware signatures may be used to determine existence of malware. In some cases, certain attributes of a device may be compared to the malware signatures to determine whether the malware is present on monitored devices. In other examples, the malware signatures may be consulted with analyzing attachments and/or links in emails, texts, or other types of messages.

Figure 8:
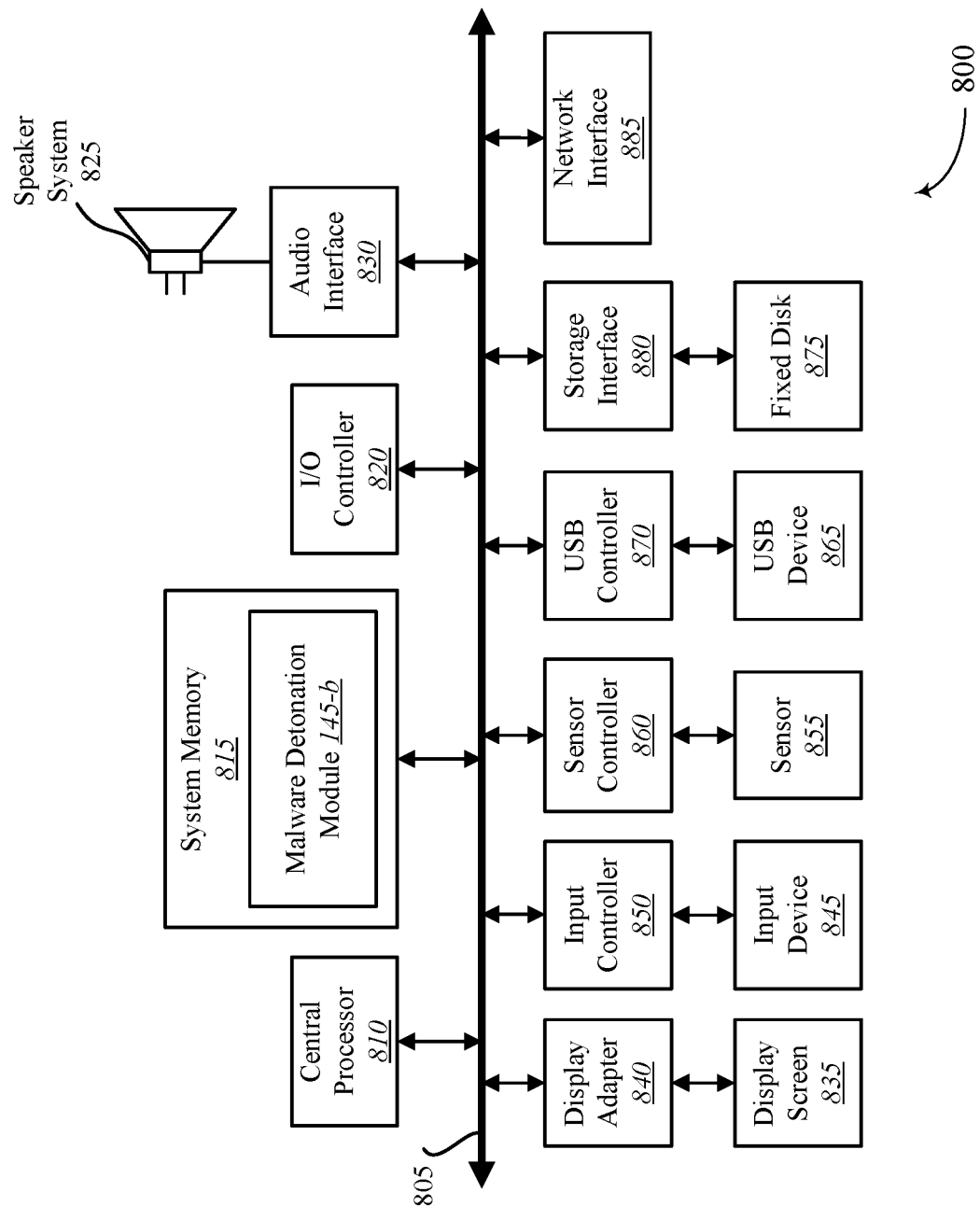
FIG. 8 depicts a block diagram of an example of a computer system suitable for implementing the present systems and methods.

FIG. 8 depicts a block diagram of a computing device 800 suitable for implementing the present systems and methods. The device 800 may be an example of device 105, and/or server 110 illustrated in FIG. 1. In one configuration, device 800 includes a bus 805 which interconnects major subsystems of device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malware detonation module 145-b to implement the present systems and methods may be stored within the system memory 815. Applications (e.g., application 140) resident with device 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of device 800, can connect to a standard computer readable medium for storage and/or retrieval of information, such as a fixed disk drive 875. Fixed disk drive 875 may be a part of device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 800 wirelessly via network interface 885.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk 875. The operating system provided on device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 885 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 820 may operate in conjunction with network interface 885 and/or storage interface 880. The network interface 885 may enable system 800 with the ability to communicate with client devices (e.g., device 105 of FIG. 1), and/or other devices over the network 115 of FIG. 1. Network interface 885 may provide wired and/or wireless network connections. In some cases, network interface 885 may include an Ethernet adapter or Fibre Channel adapter. Storage interface 880 may enable system 800 to access one or more data storage devices. The one or more data storage devices may include two or more data tiers each. The storage interface 880 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A computer-implemented method for using environment context information to detonate malware, the method being performed by one or more computing devices, each comprising one or more processors, the method comprising:
    receiving, by the one or more computing devices, an artefact associated with a first device being targeted by malware, the malware comprising a first portion and a second portion;
    simulating in a controlled environment, by the one or more computing devices, attributes of the first device based at least in part on the artefact;
    receiving a first portion of the malware at a first point in time;
    executing the first portion of the malware in the controlled environment while the attributes of the first device are being simulated;
    at a second point in time subsequent to the first point in time, receiving a second portion of the malware;
    executing the second portion of the malware in the controlled environment while the attributes of the first device are being simulated; and
    performing a security action with respect to the malware based at least in part on the execution of the first portion or the second portion of the malware in the controlled environment.

2. The method of claim 1, further comprising:
    monitoring the first device; and
    determining that the first device is being targeted by the malware based at least in part on the monitoring.

3. The method of claim 2, further comprising:
    identifying the malware based at least in part on the monitoring.

4. The method of claim 1, wherein simulating the attributes of the first device further comprises:
    acquiring the malware from the first device or in route to the first device.

5. The method of claim 1, wherein simulating the attributes of the first device further comprises:
    staging the artefacts within the controlled environment.

6. The method of claim 1, wherein the one or more computing devices include a server running the controlled environment remotely from the first device.

7. The method of claim 1, wherein performing the security action further comprises:
    identifying one or more attributes of the malware based at least in part on the malware being induced to execute by simulating the attributes of the first device.

8. The method of claim 7, wherein performing the security action further comprises:
    creating one or more signatures of the malware based at least in part on identifying the one or more attributes of the malware.

9. The method of claim 6, wherein performing the security action further comprises:
    using the one or more signatures to identify the malware on a second device different from the first device.

10. The method of claim 1, wherein the artefact is received in a system snapshot captured by a software agent running on the first device.

11. The method of claim 1, wherein the artefact comprises environment context information of the first device.

12. The method of claim 1, wherein the artefact includes at least one of an operating system manufacturer, basic input output system (BIOS) manufacturer, BIOS version, system name of the first device, system manufacturer, a user name associated with the first device, storage drive manufacturer, storage drive size, storage drive type, processor manufacturer, processor speed, processor cache entry, main memory manufacturer, main memory size, registry entry, web browser cookie, one or more files of a file system used by the first device, one or more directories of the file system, metadata of the file system, geographic location information of the first device, time zone information of the first device, mouse manufacturer, mouse movement data, keyboard manufacturer, a language associated with the keyboard, keyboard entry data, computer screen attribute, or any combinations thereof.

13. A computing device configured for using customer context to detonate malware, comprising:
    a processor;
    memory in electronic communication with the processor, wherein the memory stores computer executable instructions that when executed by the processor cause the processor to perform the steps of:
    receiving, by the one or more computing devices, an artefact associated with a first device being targeted by malware, the malware comprising a first portion and a second portion;
    simulating in a controlled environment, by the one or more computing devices, attributes of the first device based at least in part on the artefact;
    receiving a first portion of the malware at a first point in time;
    executing the first portion of the malware in the controlled environment while the attributes of the first device are being simulated;
    at a second point in time subsequent to the first point in time, receiving a second portion of the malware;
    executing the second portion of the malware in the controlled environment while the attributes of the first device are being simulated; and
    performing a security action with respect to the malware based at least in part on the execution of the first portion or the second portion of the malware in the controlled environment.

14. The computing device of claim 13, wherein the instructions executed by the processor case the processor to perform the steps of:
    monitoring the first device; and
    determining that the first device is being targeted by the malware based at least in part on the monitoring.

15. The computing device of claim 14, wherein the instructions executed by the processor case the processor to perform the step of:
    identifying the malware based at least in part on the monitoring.

16. The computing device of claim 13, wherein the instructions executed by the processor case the processor to perform the step of:
    acquiring the malware from the first device or in route to the first device.

17. The computing device of claim 13, wherein the instructions executed by the processor case the processor to perform the steps of:
   staging the artefacts within the controlled environment.

18. The computing device of claim 13, wherein the instructions executed by the processor case the processor to perform the steps of:
   identifying one or more attributes of the malware based at least in part on the malware being induced to execute by simulating the attributes of the first device.

19. The computing device of claim 13, wherein the instructions executed by the processor case the processor to perform the step of:
   creating one or more signatures of the malware based at least in part on identifying the one or more attributes of the malware.

20. A computer-program product for using customer context to detonate malware, the computer-program product comprising a non-transitory computer-readable medium storing instructions thereon, the instructions being executable by a processor to:

receiving, by the one or more computing devices, an artefact associated with a first device being targeted by malware, the malware comprising a first portion and a second portion;

simulating in a controlled environment, by the one or more computing devices, attributes of the first device based at least in part on the artefact;

receiving a first portion of the malware at a first point in time;

executing the first portion of the malware in the controlled environment while the attributes of the first device are being simulated;

at a second point in time subsequent to the first point in time, receiving a second portion of the malware;

executing the second portion of the malware in the controlled environment while the attributes of the first device are being simulated; and performing a security action with respect to the malware based at least in part on the execution of the first portion or the second portion of the malware in the controlled environment.

* * * * *